(12) United States Patent
Desbois

(10) Patent No.: US 11,225,555 B2
(45) Date of Patent: Jan. 18, 2022

(54) CAPROLACTAM FORMULATIONS

(71) Applicant: BASF SE, Ludwigshafen am Rhein (DE)

(72) Inventor: Philippe Desbois, Edingen-Neckarhausen (DE)

(73) Assignee: BASF SE, Ludwigshafen am Rhein (DE)

( * ) Notice: Subject to any disclaimer, the term of this patent is extended or adjusted under 35 U.S.C. 154(b) by 354 days.

(21) Appl. No.: 15/572,597

(22) PCT Filed: May 10, 2016

(86) PCT No.: PCT/EP2016/060459
§ 371 (c)(1),
(2) Date: Feb. 9, 2018

(87) PCT Pub. No.: WO2016/180832
PCT Pub. Date: Nov. 17, 2016

(65) Prior Publication Data
US 2019/0382542 A1    Dec. 19, 2019

(30) Foreign Application Priority Data

May 12, 2015 (EP) .................................... 15167410
Jan. 29, 2016 (EP) .................................... 16153429

(51) Int. Cl.
| | | |
|---|---|---|
| C08J 3/22 | (2006.01) | |
| C08G 69/14 | (2006.01) | |
| C08K 3/04 | (2006.01) | |
| C08K 3/40 | (2006.01) | |

(52) U.S. Cl.
CPC ............... C08J 3/22 (2013.01); C08G 69/14 (2013.01); *C08J 2377/04* (2013.01)

(58) Field of Classification Search
CPC ... C08J 3/22; C08G 69/14; C08K 3/04; C08K 3/40
See application file for complete search history.

(56) References Cited

U.S. PATENT DOCUMENTS

| | | | | |
|---|---|---|---|---|
| 3,371,055 A * | 2/1968 | Illing | ..................... | B29C 48/76 523/324 |
| 4,510,104 A * | 4/1985 | Weaver | ................... | B29C 48/92 264/40.7 |
| 7,909,500 B2 * | 3/2011 | Grutter | ................... | B29B 7/423 366/78 |
| 9,056,957 B2 * | 6/2015 | Seidel | ...................... | C08J 3/226 |
| 2005/0064177 A1 * | 3/2005 | Lee | ........................ | B82Y 10/00 428/323 |
| 2006/0173156 A1 * | 8/2006 | Van Geenen | .......... | C08G 69/20 528/310 |
| 2009/0127733 A1 * | 5/2009 | Takita | .................. | B01D 67/002 264/148 |
| 2010/0286343 A1 | 11/2010 | Burghardt et al. | | |
| 2012/0088899 A1 * | 4/2012 | Scherzer | ................ | C08L 77/02 528/325 |

FOREIGN PATENT DOCUMENTS

| | | | |
|---|---|---|---|
| EP | 2228351 A1 | * | 9/2010 |
| EP | 2666805 B1 | * | 10/2014 |
| EP | 2789641 A1 | | 10/2014 |
| WO | 2014086757 A2 | | 6/2014 |
| WO | 2015110629 A1 | | 7/2015 |
| WO | 2015114073 A1 | | 8/2015 |
| WO | 2015114076 A1 | | 8/2015 |
| WO | 2016016328 A1 | | 2/2016 |
| WO | 2016018030 A1 | | 2/2016 |
| WO | 2016055473 A1 | | 4/2016 |
| WO | 2016134829 A1 | | 9/2016 |
| WO | 2016134830 A1 | | 9/2016 |
| WO | 2016135124 A1 | | 9/2016 |

OTHER PUBLICATIONS

International Preliminary Report on Patentability for International Patent Application No. PCT/EP2016/060459, English Translation of German document dated May 8, 2017, 6 pages.

* cited by examiner

*Primary Examiner* — Tae H Yoon
(74) *Attorney, Agent, or Firm* — Armstrong Teasdale LLP

(57) ABSTRACT

A process for the production of a masterbatch (M) which includes at least one lactam and at least one fiber material is provided herein. Also described herein is the masterbatch (M) and a polymerizable two-component system (pS), as well as a process for the production of a polyamide (P), the use of the masterbatch (M) for the production of the polyamide (P), and the polyamide (P). A molding made of the polyamide (P) is also described.

9 Claims, No Drawings

CAPROLACTAM FORMULATIONS

CROSS-REFERENCE TO RELATED APPLICATIONS

This application is a U.S. National Phase Application of International Patent Application No. PCT/EP2016/060459, filed May 10, 2016, which claims the benefit of priority to European Patent Application No. 15167410.8, filed May 12, 2015, and to European Patent Application No. 16153429.2, filed Jan. 29, 2016, the entire contents of which are hereby incorporated by reference herein.

BACKGROUND

The present invention relates to a process for the production of a polymerizable mixture (pM) which comprises at least one lactam, at least one catalyst, at least one activator, and at least one fiber material. The present invention moreover relates to the polymerizable mixture (pM), and also to a process for the production of a polyamide (P) through polymerization of the polymerizable mixture (pM). The present invention further relates to the polyamide (P), and also to a molding made of the polyamide (P), and to the use of the polymerizable mixture (pM) for the production of the polyamide (P).

Polyamides are generally semicrystalline polymers which are of particular industrial importance because they feature very good mechanical properties. In particular, they have high strength, stiffness, and toughness, good chemicals resistance, and also high abrasion resistance and tracking resistance. These properties are particularly important for the production of injection moldings. High toughness is particularly important for the use of polyamides as packaging films. The properties of polyamides lead to their use in industry for the production of textiles such as fishing lines, climbing ropes, and carpeting. Polyamides are also used for the production of wall plugs, screws and bolts, and cable binders. Polyamides are also used as adhesives, coatings, and coating materials.

Polyamide moldings have increasingly been used in recent years as materials in their own right and as replacement for metallic materials, for example in automobile construction, and are capable of replacing not only parts within the power train but also metal bodywork parts. In particular, fiber-reinforced polyamide moldings are used for this purpose. Various processes are described in the prior art for the production of fiber-reinforced polyamide moldings. By way of example, a mold in which the molding is to be produced can comprise a fiber material, and the corresponding monomers for the production of the polyamide can be charged to the mold, whereupon the polymerization of the monomers is situated in situ. This generally requires only heating to a temperature that is above the melting point of the monomers and not above the melting point of the polyamide to be produced.

Another possible method for the production of polyamide moldings comprising fiber reinforcement is described by way of example in WO 2014/086757. Here, a polymerizable composition comprising a lactam, a catalyst, and an activator is applied in the form of a free-flowing solid to a fiber material, and said fiber material is then treated at elevated pressure and at a temperature at which the solid polymerizable composition is capable of flow, and finally the fiber material is cooled. The fiber material can then be subjected to a forming process. The lactam polymerizes here.

The resultant polyamide moldings intrinsically have good mechanical stability.

EP 2 789 641 describes a process for the production of compositions which comprise a lactam and/or lactone, a catalyst, and an activator. They are produced by mixing the components, for example in an extruder. The process described in EP 2 789 641 gives good results in the production of these compositions. The compositions can also comprise fillers and/or reinforcing materials. If these fillers and/or reinforcing materials are added within the extruder during the mixing of the other components, however, inhomogeneous mixtures are often obtained which have a tendency toward formation of clumps, and sometimes cause blocking of the die.

US 2010/0286343 describes a process for producing glassfiber-reinforced polyamides. Here, a glassfiber material is mixed with a lactam monomer and a polymerization catalyst and heated in an extruder so that the lactam polymerizes. This gives a glassfiber-reinforced polyamide. However, US 2010/0286343 does not describe any method for the production of a masterbatch in which the lactam is present in unpolymerized form.

EP 0 459 199 describes the production of lactam melts with relatively high viscosity. The lactam melts comprise a lactam and optionally fillers and reinforcing materials. For the production process, they are homogenized with stirring. It is disadvantageous that these lactam melts cannot be produced, or are difficult to produce, in an extruder because inhomogeneous mixtures are often obtained which have a tendency toward formation of clumps and sometimes block the die.

There is therefore a need for further processes for the production of moldings made of a polyamide (P) with good mechanical stability, and also a need for polymerizable mixtures (pM) which permit the production of these moldings, and a need for processes for the production of the corresponding polymerizable mixtures (pM).

The object underlying the present invention is therefore the provision of a process for the production of a polymerizable mixture (pM) which permits the production of moldings made of a polyamide (P).

DETAILED DESCRIPTION

Said object is achieved via a process for the production of a polymerizable mixture (pM) which comprises the following components (A) at least one lactam,
(B) at least one catalyst,
(C) at least one activator,
(D) at least one fiber material, which comprises compounding components (A), (B), (C), and (D) in an extruder with a shear rate of at least $500 \text{ s}^{-1}$ to give the polymerizable mixture (pM).

The polymerizable mixture (pM) produced in the invention can be stored, transported, and handled, and can also be used at a subsequent juncture for the production of a polyamide (P). It is moreover advantageous that polymerization of the polymerizable mixture (pM) does not require any complicated reactive polymerization process requiring use of two components as for example in the case of RTM (Reaction Transfer Molding) or in the case of RIM (Reaction Injection Molding). Instead, the polymerizable mixture (pM) can be polymerized without addition of further components. The polymerizable mixture (pM) of the invention is therefore ready to use. The polyamides (P) obtainable via polymerization of the polymerizable mixture (pM) moreover exhibit lower residual monomer content than the polyamides described in the prior art.

The polyamides (P) produced with the polymerizable mixture (pM) produced in the invention, and also moldings made thereof, moreover exhibit particularly uniform distribution of the at least one fiber material (component (D)), and this provides particularly good mechanical stability and reinforcement of the molding.

The polymerizable mixture (pM) produced in the invention is in particular suitable for injection-molding processes where, surprisingly, despite the at least one fiber material (component (D)) comprised in the polymerizable mixture (pM), the nozzles do not become blocked during the injection-molding process. Polymerization of the polymerizable mixture (pM) is moreover particularly complete, resulting in the low residual monomer content of the polyamide (P) obtained.

The process of the invention is explained in more detail below.

The process of the invention compounds components (A)—at least one lactam, (B)—at least one catalyst, (C)—at least one activator, and (D)—at least one fiber material in an extruder with shear rate of at least 500 s$^{-1}$.

For the purposes of the present invention, "compounding" means the mixing of components (A), (B), (C), and (D).

Components (A), (B), (C), and (D) can be compounded in the extruder by any of the methods known to the person skilled in the art. By way of example, components (A), (B), (C), and (D) can be introduced together into the extruder and compounded therein.

It is equally possible, and in the invention it is preferable, that only two of components (A), (B), (C), and (D) are initially introduced into the extruder and mixed (compounded) with one another. One of components (A), (B), (C), and (D) that has not yet been compounded is then next introduced into the extruder and compounded with the already compounded components. Finally, that component (A), (B), (C), or (D) that has not yet been compounded is introduced into the extruder and compounded with the already compounded components to give the polymerizable mixture (pM). It is moreover possible, once two of components (A), (B), (C), and (D) have been compounded in the extruder, to introduce into the extruder, the other two of components (A), (B), (C), and (D) that have not been compounded, and to compound these with the already compounded components to give the polymerizable mixture (pM). This embodiment is preferred.

By way of example, component (A) is initially introduced into, and compounded in, the extruder together with component (B). Component (D) is then added and compounded together with components (A) and (B). Finally, component (C) is added optionally together with further component (A) and compounded with components (A), (B), and (D) already present in the extruder to give the polymerizable mixture (pM).

It is equally possible to introduce component (A) and component (C) into the extruder and to compound these therein. Component (D) is then added and compounded with components (A) and (C) comprised in the extruder. Finally, component (B) is added to the extruder optionally together with further component (A) and compounded with components (A), (C), and (D) already present in the extruder to give the polymerizable mixture (pM).

It is particularly preferable that component (A) is initially compounded with component (D) in the extruder. Components (B) and (C), optionally with further component (A), are then likewise introduced together or sequentially into the extruder and compounded with components (A) and (D) already comprised in the extruder.

When components (B) and (C) are introduced together into the extruder, it is preferable that component (B) and component (C) are respectively introduced separately from one another, i.e. with spatial separation from one another, into the extruder. It is moreover preferable that components (B) and (C) are respectively introduced together with further component (A) into the extruder.

In one embodiment to which preference is in particular given, the compounding of components (A), (B), (C), and (D) in the extruder comprises the following steps:
  a) provision, in the extruder, of a first mixture (M1) which comprises components (A) and (D),
  b) addition of component (C) to the first mixture (M1) in the extruder to give a second mixture (M2) in the extruder,
  c) addition of component (B) to the second mixture (M2) in the extruder to give the polymerizable mixture (pM) in the extruder.

The present invention therefore also provides a process in which the compounding of components (A), (B), (C), and (D) in the extruder comprises the following steps:
a) provision, in the extruder, of a first mixture (M1) which comprises components (A) and (D),
b) addition of component (C) to the first mixture (M1) in the extruder to give a second mixture (M2) in the extruder,
c) addition of component (B) to the second mixture (M2) in the extruder to give the polymerizable mixture (pM) in the extruder.

It is more preferable in the invention that the steps b) and c) are carried out simultaneously.

The present invention therefore also provides a process in which the steps b) and c) are carried out simultaneously.

It is self-evident that when the steps b) and c) are carried out simultaneously the second mixture (M2) is formed only for a short time and as an intermediate. It is therefore preferable that, when the steps b) and c) are carried out simultaneously, component (C) and component (B) are added simultaneously to the first mixture (M1) in the extruder to give the polymerizable mixture (pM) in the extruder.

The present invention therefore also provides a process in which the steps b) and c) are carried out simultaneously, where component (B) and component (C) are added to the first mixture (M1) in the extruder to give the polymerizable mixture (pM) in the extruder.

It is moreover preferable in the invention that in step b) component (C) is added together with further component (A) to the first mixture (M1) and/or that in step c) component (B) is added into the extruder together with further component (A) to the second mixture (M2).

The present invention therefore also provides a process in which in step b) component (C) is added into the extruder together with further component (A) to the first mixture (M1) to give a second mixture (M2) in the extruder and/or in which in step c) component (B) is added into the extruder together with further component (A) to the second mixture (M2) to give the polymerizable mixture (pM).

The first mixture (M1) can be provided in step a) by any of the methods known to the person skilled in the art. By way of example, component (A) can be introduced initially into the extruder, and component (D) can then be introduced. Components (A) and (D) are then compounded to give the first mixture (M1).

In a preferred embodiment, component (C) is then added to the first mixture (M1). The first mixture (M1) is then compounded with component (C) to give the second mixture (M2). In a preferred embodiment, component (B) is then added to the second mixture (M2) and component (B) is then compounded with the second mixture (M2) to give the polymerizable mixture (pM).

Step a) can be carried out at any desired temperature, with the proviso that component (A) is liquid under the conditions prevailing in the extruder.

By way of example, step a) can be carried out with a jacket temperature of the extruder in the range from 105 to 220° C., preferably with a jacket temperature of the extruder in the range from 110 to 180° C., and with particular preference with a jacket temperature of the extruder in the range from 115 to 175° C.

For the purposes of the present invention, "liquid" means that component (A) can be conveyed in the extruder.

"Jacket temperature of the extruder" means the temperature of the jacket of the extruder. The jacket temperature of the extruder is therefore the temperature of the external wall of the extruder barrel.

The jacket temperature of the extruder can be higher than the temperature of the components in the extruder, and it is equally possible that the jacket temperature of the extruder is lower than the temperature of the components in the extruder. By way of example, it is possible that the jacket temperature of the extruder is initially higher than the temperature of the components in the extruder when the components are being heated. When the components in the extruder are being cooled, it is possible that the jacket temperature of the extruder is lower than the temperature of the components in the extruder.

It is usual that the extruder is heated or cooled during the process of the invention. The heating and the cooling of the extruder can be achieved by any of the methods known to the person skilled in the art. It is usual that the extruder is heated via the friction of heat that is liberated during the compounding of components (A), (B), (C), and (D). It is also possible that the extruder is heated externally, for example via circulation of a liquid within the extruder barrel. This liquid can also be used for the cooling of the extruder. These methods are known per se to the person skilled in the art.

Step b) can likewise be carried out at any desired temperature at which component (A) is liquid under the conditions prevailing in the extruder. It is preferable that step b) is carried out with a jacket temperature of the extruder in the range from 20 to <105° C., preferably in the range from 30 to 102° C., and with particular preference with a jacket temperature of the extruder in the range from 35 to 100° C.

In step c), component (A) can already polymerize partially to give a polyamide (P). In the context of the polymerization of component (A) in step c), the polymerization of component (A) is defined as including the formation of oligomers of component (A). These reactions are known to the person skilled in the art.

It is preferable that step c) is carried out in such a way that after step c) component (A) is in essence present in unpolymerized form. For the purposes of the present invention, "in essence in unpolymerized form" means that at most 50%, preferably at most 20%, and with particular preference at most 5%, of component (A) is present in polymerized form, based in each case on the total quantity of component (A) used.

Step c) can likewise be carried out at any desired temperature at which component (A) is liquid under the conditions in the extruder and at which component (A) is in essence present in unpolymerized form.

It is usual that the jacket temperature of the extruder during step c) is in the range from 20 to <105° C., preferably in the range from 30 to 102° C., and with particular preference in the range from 35 to 100° C.

The polymerizable mixture (pM) obtained in step c) is generally removed from the extruder after step c). The polymerizable mixture (pM) can be removed from the extruder by any of the methods known to the person skilled in the art. It is preferable that after step c) the polymerizable mixture (pM) is pelletized to give a pelletized polymerizable mixture (gpM) (step d)).

The present invention therefore also provides a process in which the following step is carried out after step c):

d) pelletization of the polymerizable mixture (pM) obtained in step c) to give a pelletized polymerizable mixture (gpM).

Processes for the pelletization of the polymerizable mixture (pM) are known per se to the person skilled in the art. By way of example, the polymerizable mixture (pM) can be cooled on a conveyor belt and then pelletized. It is moreover possible that on removal from the extruder the polymerizable mixture (pM) is obtained directly in the form of pellets, as pelletized polymerizable mixture (gpM). In this embodiment there is no requirement for any additional pelletization.

The time that expires between adding of component (B) to the second mixture (M2) in step c) and removing of the polymerizable mixture (pM) from the extruder is usually at most 10 minutes, preferably at most 5 minutes, and with particular preference at most 1 minute.

When the polymerizable mixture (pM) obtained in step c) is pelletized in step d) to give the pelletized polymerizable mixture (gpM), the time that expires between adding component (B) in step c) and obtaining the pelletized polymerizable mixture (gpM) in step d) is preferably at most 10 minutes, with particular preference at most 5 minutes, and most preferably at most 1 minute.

The present invention therefore also provides a process in which the time that expires between adding component (B) in step c) and obtaining the pelletized polymerizable mixture (gpM) in step d) is at most 10 minutes.

The shear rate of the extruder in the invention is at least 500 s$^{-1}$, preferably at least 800 s$^{-1}$, and with particular preference at least 1000 s$^{-1}$.

The shear rate of the extruder is by way of example in the range from 500 to 25 000 s$^{-1}$, preferably in the range from 800 to 25 000 s$^{-1}$ and with particular preference in the range from 1000 to 25 000 s$^{-1}$.

The shear rate of the extruder can be calculated by using the following formula:

$$S = (\pi \cdot d \cdot N)/\Delta$$

where

S is the shear rate,
d is the diameter of the extruder screw,
N is the rotation rate of the extruder screw, and
Δ is the width of the gap between the exterior wall of the screw and the internal wall of the extruder.

The diameter (d) of the screw is usually in the range from 10 to 300 mm, preferably in the range from 20 to 200 mm, and with particular preference in the range from 50 to 100 mm.

The rotation rate (N) of the screw is by way of example in the range from 50 to 2000 rpm (revolutions per minute), preferably in the range from 80 to 1500 rpm, and with particular preference in the range from 100 to 1200 rpm.

The width (Δ) of the gap is usually in the range from 10 to 500 µm, preferably in the range from 50 to 250 µm, and with particular preference in the range from 100 to 200 µm.

The shear stress (σ) exerted by the extruder on the components comprised is obtained from the product of the shear rate (S) of the extruder and the viscosity (η) of the components comprised in the extruder:

$$\sigma = S \cdot \eta$$

The viscosity (η) of the components comprised in the extruder is usually in the range from 2 to 1000 mPas, preferably in the range from 5 to 500 mPas, and with particular preference in the range from 10 to 300 mPas, measured by a shear-stress-controlled rotary viscometer at shear rate 100 s$^{-1}$ and temperature 100° C.

The shear stress (σ) is therefore by way of example in the range from 2.5 to 12 500 Pa, preferably in the range from 4 to 12 500 Pa, and with particular preference in the range from 5 to 12 500 Pa.

Suitable extruders are any of the extruders known to the person skilled in the art, for example single-screw extruders or twin-screw extruders. Preference is given in the invention to twin-screw extruders. Single-screw extruders and twin-screw extruders are known to the person skilled in the art.

The extruder preferably comprises at least two sections.

With particular preference the extruder comprises at least the following sections:

(I) a first section,
(II) a second section, and
(III) a third section.

The individual sections of the extruder differ in the concentration of components (A), (B), (C), and (D), and also optional component (E), comprised in these sections.

The present invention therefore also provides a process in which the concentration of components (A), (B), (C), and (D) in the first section (I) of the extruder differs from the concentration of components (A), (B), (C), and (D) in the second section (II) and in the third section (III) of the extruder, and in which the concentration of components (A), (B), (C), and (D) in the second section (II) of the extruder differs from the concentration of components (A), (B), (C), and (D) in the third section (III) of the extruder.

The sections can moreover by way of example differ in the temperature ranges prevailing in the respective sections of the extruder, and also optionally in the pressure ranges prevailing in the respective sections of the extruder.

By way of example, a first temperature (T1) can prevail in the first section (I) of the extruder. For the purposes of the present invention, "a first temperature (T1)" means that there can be, in the first section (I), precisely one first temperature (T1) prevailing which is equal (constant) across the entire first section (I); equally, it is possible that there are two or more first temperatures (T1) prevailing in the extruder. If there are two or more first temperatures (T1) prevailing in the first section (I) of the extruder, it is possible that there is a temperature gradient prevailing in the first section (I), and that the first temperature (T1) continuously increases or decreases. Equally, it is possible that regions of constant first temperature (T1) alternate with regions in which the first temperature continuously increases or decreases. It is moreover also possible that the temperature changes suddenly between regions of constant first temperature (T1).

The first temperature (T1) is preferably in the range from 20 to 70° C., particularly preferably in the range from 25 to 50° C., and with particular preference in the range from 30 to 40° C.

A second temperature (T2) can prevail in the second section (II) of the extruder. For the purposes of the present invention, "a second temperature (T2)" means that there can be, in the second section (II), precisely one second temperature (T2) prevailing which is equal (constant) across the entire second section (II); equally, it is possible that there are two or more second temperatures (T2) prevailing in the second section (II) of the extruder. If there are two or more second temperatures (T2) prevailing in the second section (II) of the extruder, it is possible that there is a temperature gradient prevailing in the second section (II), and that the second temperature (T2) continuously increases or decreases. Equally, it is possible that regions of constant second temperature (T2) alternate with regions in which the second temperature (T2) continuously increases or decreases. It is moreover also possible that the temperature changes suddenly between regions of constant second temperature (T2).

The second temperature (T2) is preferably in the range from 105 to 220° C., particularly preferably in the range from 110 to 180° C., and with particular preference in the range from 115 to 175° C.

In the third section (III) of the extruder by way of example there is a third temperature (T3) prevailing. For the purposes of the present invention, "a third temperature (T3)" means that there can be, in the third section (III), precisely one third temperature (T3) prevailing which is equal (constant) across the entire third section (III); equally, it is possible that there are two or more third temperatures (T3) prevailing in the third section (III) of the extruder. If there are two or more third temperatures (T3) prevailing in the third section (III) of the extruder, it is possible that there is a temperature gradient prevailing in the third section (III), and that the third temperature (T3) continuously increases or decreases. Equally, it is possible that regions of constant third temperature (T3) alternate with regions in which the third temperature (T3) continuously increases or decreases. It is moreover also possible that the temperature changes suddenly between regions of constant third temperature (T3).

The third temperature (T3) is preferably in the range from 20 to <105° C., particularly preferably in the range from 30 to 102° C., and with particular preference in the range from 35 to 100° C.

It is preferable that the second temperature (T2) differs from the first temperature (T1) and from the third temperature (T3).

The present invention therefore also comprises a process in which the second temperature (T2) differs from the first temperature (T1), and in which the second temperature (T2) differs from the third temperature (T3).

It is therefore preferable that the extruder comprises at least the following sections:

(I) a first section,
(II) a second section, and
(III) a third section, where a first temperature (T1) prevails in the first section (I) of the extruder, a second temperature (T2) prevails in the second section (II), and a third temperature (T3) prevails in the third section (III), where the second temperature (T2) is in the range from 105 to 220° C.

The present invention therefore also provides a process in which the extruder comprises at least the following sections:

(I) a first section,
(II) a second section, and
(III) a third section, where a first temperature (T1) prevails in the first section (I) of the extruder, a second temperature (T2) prevails in the second section (II), and a third temperature (T3) prevails in the third section (III), where the second temperature (T2) is in the range from 105 to 220° C.

It is moreover preferable that a first temperature (T1) in the range from 20 to 70° C. prevails in the first section (I) of the extruder and/or a third temperature (T3) in the range from 20 to <105° C. prevails in the third section (III) of the extruder.

The present invention therefore also provides a process in which there is a first temperature (T1) in the range from 20 to 70° C. prevailing in the first section (I) of the extruder and/or a third temperature (T3) in the range from 20 to <105° C. prevailing in the third section (III) of the extruder.

The expressions first temperature (T1), second temperature (T2), and third temperature (T3) respectively mean the jacket temperature of the extruder in the respective sections. The first temperature (T1) prevailing in the first section (I) of the extruder is therefore also termed first jacket temperature of the extruder. The expressions "first temperature (T1)" and "first jacket temperature" are therefore used as synonyms for the purposes of the present invention, and therefore have the same meaning. The second temperature (T2) prevailing in the second section (II) of the extruder is therefore also called second jacket temperature of the extruder. The terms "second temperature (T2)" and "second jacket temperature" are therefore used as synonyms for the purposes of the present invention, and therefore have the same meaning. The third temperature (T3) prevailing in the third section (III) of the extruder is therefore also called third jacket temperature of the extruder. The terms "third temperature (T3)" and "third jacket temperature" are therefore used as synonyms for the purposes of the present invention, and therefore have the same meaning.

The descriptions above relating to the jacket temperature of the extruder apply correspondingly to determination of the first jacket temperature, the second jacket temperature, and the third jacket temperature Each section of the extruder moreover comprises at least one zone.

For the purposes of the present invention, "at least one zone" means either precisely one zone or else two or more zones.

If a section of an extruder comprises precisely one zone, the section of the extruder corresponds to the zone.

The zones differ by way of example in the temperature within the zones, in the pressure within the zones, and/or in the elements comprised within the zones.

The zones can moreover differ in the length of the elements comprised.

The expression "elements comprised" means by way of example conveying elements, flow-restricting elements, mixing elements, and kneading elements. Suitable conveying elements, flow-restricting elements, mixing elements, and kneading elements which can be comprised in the extruder are known to the person skilled in the art.

Conveying elements serve for the onward transport of the components comprised within the extruder. The shear rate acting on the components in the extruder via the conveying elements is smaller than the shear rate acting on the components in the extruder via mixing elements or kneading elements. Suitable conveying elements are known to the person skilled in the art and are by way of example screw-conveying elements.

Mixing elements serve for the mixing of the individual components comprised in the extruder. The shear rate acting on the components in the extruder via the mixing elements is usually smaller than the shear rate acting on the components via kneading elements. Suitable mixing elements are known to the person skilled in the art and are by way of example toothed mixing elements or screw mixing elements.

Kneading elements likewise serve for the mixing of the individual components comprised in the extruder. At the same time, they comminute by way of example component (D). The shear rate acting on the components in the extruder via the kneading elements is usually higher than the shear rate acting on the components via mixing elements and via conveying elements. Suitable kneading elements are known to the person skilled in the art and are by way of example kneading screws or kneading blocks, for example disk kneading blocks or shoulder kneading blocks.

Flow-restricting elements are unlike conveying elements in having reverse-conveying effect, and thus restrict the flow of the components comprised in the extruder. Flow-restricting elements usually used are conveying elements mounted in such a way that their direction of conveying is opposite to the direction of transport in the extruder.

Zones comprising conveying elements are also called "conveying zones". Zones comprising flow-restricting elements are also called "flow-restricting zones". Zones comprising mixing elements are also called "mixing zones", and zones comprising kneading elements are also called "kneading zones".

In one embodiment, the extruder comprises from 1 to 20 conveying zones, from 1 to 10 flow-restricting zones, from 1 to 10 mixing zones, and from 1 to 10 kneading zones, preferably from 2 to 15 conveying zones, from 1 to 8 flow-restricting zones, from 1 to 5 mixing zones, and from 2 to 10 kneading zones, with particular preference from 5 to 13 conveying zones, from 1 to 5 flow-restricting zones, from 1 to 3 mixing zones, and from 3 to 7 kneading zones.

By way of example, the first section (I) of the extruder preferably comprises from 1 to 5 conveying zones and optionally from 1 to 3 mixing zones, particularly preferably from 1 to 3 conveying zones and optionally one mixing zone, and with particular preference precisely one conveying zone.

Equally, the second section (II) of the extruder preferably comprises from 2 to 10 kneading zones and from 1 to 10 conveying zones, preferably from 2 to 8 kneading zones and from 1 to 8 conveying zones, and with particular preference from 2 to 5 kneading zones and from 1 to 4 conveying zones.

The third section (III) of the extruder moreover preferably comprises from 1 to 5 mixing zones, from 1 to 5 kneading zones, from 2 to 10 conveying zones, and from 1 to 5 flow-restricting zones, preferably from 1 to 4 mixing zones, from 1 to 3 kneading zones, from 2 to 8 conveying zones, and from 1 to 4 flow-restricting zones, and with particular preference from 1 to 3 mixing zones, from 1 to 2 kneading zones, from 2 to 5 conveying zones, and from 1 to 3 flow-restricting zones.

The present invention therefore also provides a process in which the second section (II) of the extruder comprises from 2 to 10 kneading zones and from 1 to 10 conveying zones and/or the third section (III) of the extruder comprises from 1 to 5 mixing zones, from 1 to 5 kneading zones, from 2 to 10 conveying zones, and from 1 to 5 flow-restricting zones.

It is usual that at least one conveying zone is always followed by at least one mixing zone, or at least one kneading zone, or at least one flow-restricting zone.

It is usual that a conveying zone is always followed by precisely one mixing zone, or precisely one kneading zone, or precisely one flow-restricting zone.

It is preferable in the invention that the extruder comprises a mixing zone immediately before the point of removal of the polymerizable mixture (pM), preferably immediately before the die for removal of the polymerizable mixture (pM). It is particularly preferable that the extruder comprises a mixing zone with at least one toothed-disk element in screw configuration immediately before the point of removal of the polymerizable mixture (pM), preferably immediately before the die for removal of the polymerizable mixture (pM).

"At least one toothed-disk element" means for the purposes of the present invention either precisely one toothed-disk element or else two or more toothed-disk elements. Preference is given to two or more toothed-disk elements, and particular preference is given to from 2 to 5 toothed-disk elements.

In an embodiment that is preferred in the invention, the first mixture (M1) is provided in step a) in that component (A) is introduced into the extruder. When component (A) is introduced into the extruder it can be in any of the forms known to the person skilled in the art, for example in the form of pellets, or of powder, or in liquid form.

If component (A) is introduced in solid form, i.e. by way of example as pellets, into the extruder it is then usually first liquefied in the extruder and introduced into at least one conveying zone, preferably into precisely one conveying zone. This at least one conveying zone is preferably followed by at least one kneading zone, particularly preferably precisely one kneading zone, in which component (D) is added. The at least one kneading zone, preferably precisely one kneading zone, in which component (D) is added is usually followed by at least one further conveying zone and at least one further kneading zone, preferably from 2 to 10 kneading zones and from 1 to 10 conveying zones. These from 2 to 10 kneading zones and from 1 to 10 conveying zones preferably alternate in such a way that a kneading zone is followed by a conveying zone and a conveying zone is followed by a kneading zone. In these, component (A) is then compounded with component (D) to give the first mixture (M1). This corresponds to step a) of the preferred embodiment of the process of the invention.

In another kneading zone, components (B) and (C) are then added. This kneading zone is usually followed by at least one conveying zone and at least one kneading zone, and also optionally at by at least one flow-restricting zone, and at least one mixing zone in which components (B) and (C) are compounded with the first mixture (M1) to give the polymerizable mixture (pM). This corresponds to simultaneous conduct of the steps b) and c) of the particularly preferred embodiment of the process of the invention.

In this embodiment, by way of example the first section of the extruder is the section in which the extruder comprises component (A). The second section (II) begins with the addition of component (D) into the extruder. The third section (III) begins with the addition of components (B) and (C) to the extruder.

In another preferred embodiment, a first portion of component (A) is initially introduced into the extruder. This introduction is correspondingly subject to the descriptions and preferences above relating to the introduction of component (A). Component (D) is then added in a kneading zone. This kneading zone in which component (D) is added is preferably followed by at least one conveying zone and at least one kneading zone; in these the first portion of component (A) is compounded with component (D) to give a first mixture (M1) which comprises component (D) and the first portion of component (A). The at least one conveying zone and the at least one kneading zone are correspondingly subject to the above descriptions and preferences. This step likewise corresponds to the step a) of the preferred process of the invention.

In a further kneading zone, a second portion of component (A) is then added together with component (B), and a third portion of component (A) is then added together with component (C). This kneading zone is usually followed by at least one conveying zone and at least one kneading zone, also optionally by at least one flow-restricting zone and at least one mixing zone in which the second portion of component (A), the third portion of component (A), and also components (B) and (C), are compounded with the first mixture (M1) to give the polymerizable mixture (pM). This step corresponds to the simultaneous conduct of the steps b) and c) in a particularly preferred embodiment of the process of the invention.

This embodiment is preferred. In this embodiment, by way of example the first section (I) of the extruder is the section in which the extruder comprises the first portion of component (A). The second section (II) begins with the addition of component (D) to the extruder. The third section (III) begins with the addition of the second portion of component (A) and of the third portion of component (A), and also of components (B) and (C), to the extruder.

In the first section (I) of the extruder, the extruder therefore comprises component (A). In the second section (II) of the extruder, the extruder comprises components (A) and (D), and in the third section (III) of the extruder the extruder comprises components (A), (B), (C), and (D). It is self-evident in that when optional component (E) described at a later stage below, at least one thickener, is also added to a section of the extruder, this section also comprises said component, as also do the sections downstream thereof.

The quantitative proportions of components (A), (B), (C), and (D) compounded in the extruder are usually the same as those intended to be comprised in the polymerizable mixture (pM) to be produced. For example, from 28.5 to 90% by weight of component (A), from 1 to 20% by weight of component (B), from 0.5 to 10% by weight of component (C), and from 8.5 to 70% by weight of component (D), based in each case on the total of the percentages by weight of components (A), (B), (C), and (D), are compounded in the extruder.

It is preferable that from 37 to 80% by weight of component (A), from 2 to 10% by weight of component (B), from 1 to 5% by weight of component (C), and from 17 to 60% by weight of component (D), based in each case on the total of the percentages by weight of components (A), (B), (C), and (D), are compounded in the extruder.

It is particularly preferable that from 45.5 to 70% by weight of component (A), from 3 to 6% by weight of component (B), from 1.5 to 3% by weight of component (C), and from 25.5 to 50% by weight of component (D), based in each case on the total of the percentages by weight of components (A), (B), (C), and (D), are compounded in the extruder.

When, in a preferred embodiment of the present invention, a first portion of component (A) is initially introduced into the extruder, and then component (D) is introduced, and then a second and a third portion of component (A) are introduced together with components (B) and (C), it is preferable to introduce, as first portion of component (A), from 20 to 80% of component (A), and to introduce, as second and third portion of component (A) in total from 80 to 20% of component (A), based in each case on the total quantity of component (A) introduced into the extruder. It is particularly preferable to introduce, as first portion of component (A), from 40 to 60% of component (A), and to introduce, as second and third portion of component (A), from 60 to 40% of component (A), based in each case on the total quantity of component (A) introduced into the extruder.

Components (A), (B), (C), (D) and, where appropriate, (E), and also, where appropriate, the other components that can be compounded in the extruder, are correspondingly subject to the descriptions and preferences provided below for components (A), (B), (C), and (D) and, where appropriate, (E), and also, where appropriate, the other components comprised in the polymerizable mixture (pM).

Polymerizable Mixture (pM)

In the invention, the polymerizable mixture (pM) obtained by the process of the invention comprises components (A)—at least one lactam, (B)—at least one catalyst, (C)—at least one activator, and (D)—at least one fiber material.

By way of example, the polymerizable mixture (pM) comprises from 28.5 to 90% by weight of component (A), from 1 to 20% by weight of component (B), from 0.5 to 10% by weight of component (C), and from 8.5 to 70% by weight of component (D) based in each case on the sum of the percentages by weight of components (A), (B), (C), and (D), preferably based on the total weight of the polymerizable mixture (pM).

It is preferable that the polymerizable mixture (pM) comprises from 37 to 80% by weight of component (A), from 2 to 10% by weight of component (B), from 1 to 5% by weight of component (C), and from 17 to 60% by weight of component (D) based in each case on the sum of the percentages by weight of components (A), (B), (C), and (D), preferably based on the total weight of the polymerizable mixture (pM).

With particular preference, the polymerizable mixture (pM) comprises from 45.5 to 70% by weight of component (A), from 3 to 6% by weight of component (B), from 1.5 to 3% by weight of component (C), and from 25.5 to 50% by weight of component (D) based in each case on the sum of the percentages by weight of components (A), (B), (C), and (D), preferably based on the total weight of the polymerizable mixture (pM).

The present invention therefore also provides a process in which the polymerizable mixture (pM) comprises from 28.5 to 90% by weight of component (A), from 1 to 20% by weight of component (B), from 0.5 to 10% by weight of component (C), and from 8.5 to 70% by weight of component (D) based in each case on the total weight of the polymerizable mixture (pM).

In a preferred embodiment, the polymerizable mixture (pM) also comprises a component (E)—at least one thickener. Thickeners per se are known to the person skilled in the art. It is preferable that component (E) is selected from the group consisting of thermoplastic polystyrenes, polysulfones, polyphenyl ethers, polybutadienes, polyisoprenes, and nanofillers.

Examples of suitable nanofillers are silicates, graphenes, and carbon nanotubes.

The present invention therefore also provides a process in which the polymerizable mixture (pM) also comprises a component (E), at least one thickener, where component (E) is selected from the group consisting of thermoplastic polystyrenes, polysulfones, polyphenyl ethers, polybutadienes, polyisoprenes, and nanofillers.

The polymerizable mixture (pM) comprises by way of example from 0.1 to 50% by weight, preferably from 0.5 to 30% by weight, and with particular preference in the range from 1 to 20% by weight, of component (E), based on the total weight of the polymerizable mixture (pM).

The polymerizable mixture can moreover comprise other components. These other components are known per se to the person skilled in the art and are by way of example stabilizers, dyes, antistatic agents, filler oils, surface-improvers, desiccants, mold-release agents, other release agents, antioxidants, light stabilizers, PVC stabilizers, lubricants, flame retardants, blowing agents, impact modifiers, and nucleating agents.

The polymerizable mixture (pM) comprises by way of example from 0.1 to 10% by weight, preferably from 0.2 to 7% by weight, and with particular preference from 0.3 to 5% by weight, of the other components, based on the total weight of the polymerizable mixture (pM).

The other components optionally comprised in the polymerizable mixture (pM), and also optionally component (E), are usually likewise compounded in the extruder together with components (A), (B), (C) and (D) for the production of the polymerizable mixture (pM).

The polymerizable mixture (pM) can moreover also comprise component (A) that has already been polymerized. It is usual that the polymerizable mixture (pM) comprises at most 50% by weight, preferably at most 20% by weight, and with particular preference at most 5% by weight, of polymerized component (A) based on the total weight of the polymerizable mixture (pM).

It is self-evident that polymerized component (A) is not compounded with components (A), (B), (C), and (D) in the extruder, but instead, as described above, can be formed via polymerization of component (A) during the compounding in the extruder, in particular during step c).

The sum of the percentages by weight of components (A), (B), (C), and (D) comprised in the polymerizable mixture (pM) is usually 100%. It is self-evident that when the polymerizable mixture (pM) comprises other components, and also optionally component (E), and polymerized component (A), the sum of the percentages by weight of components (A), (B), (C), and (D), and also of the other components optionally comprised, of component (E), and of polymerized component (A) is usually 100%.

The polymerizable mixture (pM) comprises component (D) dispersed in components (A), (B), (C), and also optionally (E). Component (D) is therefore also called "disperse phase", and components (A), (B), (C), and also, where appropriate, (E) are also called "continuous phase".

The viscosity of the continuous phase, i.e. of components (A), (B), (C), and also, where appropriate (E) present in the polymerizable mixture (pM), without component (D), is by way of example in the range from 2 to 1000 mPas, preferably in the range from 5 to 500 mPas, and with particular preference in the range from 10 to 300 mPas, measured with a shear-stress-controlled rotary viscometer at shear rate 100 $s^{-1}$ and at temperature 100° C.

The present invention moreover provides the polymerizable mixture (pM) obtainable via the process of the invention.

The polymerizable mixture (pM) obtainable via the process of the invention is correspondingly subject to the above descriptions and preferences relating to the process of the invention.

Components (A), (B), (C), and (D) comprised in the polymerizable mixture (pM) are explained in more detail below.

Component (A): Lactam

Component (A) in the invention is at least one lactam.

The terms "component (A)" and "at least one lactam" are used as synonyms in the present invention and therefore have the same meaning.

"Lactam" in the invention means cyclic amides having from 4 to 12 carbon atoms in the ring, preferably from 6 to 12 carbon atoms.

The present invention therefore also provides a process in which component (A) comprises at least one lactam having 4 to 12 carbon atoms.

Examples of suitable lactams are selected from the group consisting of 4-aminobutanolactam (γ-lactam; γ-butyrolactam; pyrrolidone), 5-aminopentanolactam lactam; δ-valerolactam; piperidone), 6-aminohexanolactam (ε-lactam; ε-caprolactam), 7-aminoheptanolactam ζ-lactam; ζ-heptanolactam; enantholactam), 8-aminooctanolactam (η-lactam; η-octanolactam; caprylolactam), 9-nonanolactam (θ-lactam; θ-nonanolactam), 10-decanolactam (ω-decanolactam; capric lactam), 11-undecanolactam (ω-undecanolactam), and 12-dodecanolactam (ω-dodecanolactam; laurolactam).

The present invention therefore also provides a process in which component (A) is selected from the group consisting of pyrrolidone, piperidone, ε-caprolactam, enantholactam, caprylolactam, capric lactam and laurolactam.

The lactams can be unsubstituted or can be at least monosubstituted. If at least monosubstituted lactams are used, these can bear, at the ring carbon atoms, one, two, or more substituents selected mutually independently from the group consisting of $C_1$- to $C_{10}$-alkyl, $C_5$- to $C_6$-cycloalkyl, and $C_5$- to $C_{10}$-aryl.

It is preferable that component (A) is unsubstituted.

Examples of suitable $C_1$- to $C_{10}$-alkyl substituents are methyl, ethyl, propyl, isopropyl, n-butyl, sec-butyl, and tert-butyl. An example of a suitable $C_5$- to $C_6$-cycloalkyl substituent is cyclohexyl. Preferred $C_5$- to $C_{10}$-aryl substituents are phenyl and anthranyl.

It is particularly preferable to use unsubstituted lactams, preference being given here to 12-dodecanolactam (ω-dodecanolactam) and ε-lactam (ε-caprolactam). Most preference is given to ε-lactam (ε-caprolactam).

ε-Caprolactam is the cyclic amide of caproic acid. It is also called 6-aminohexanolactam, 6-hexanolactam or caprolactam. Its IUPAC name is "Acepan-2-one". The CAS number of caprolactam is 105-60-2, and its molecular formula is $C_6H_{11}NO$. Processes for the production of caprolactam are known to the person skilled in the art.

Component (B): Catalyst

Component (B) in the invention is at least one catalyst.

The terms "component (B)" and "at least one catalyst" are used as synonyms in the present invention, and therefore have the same meaning.

at least one catalyst is preferably a catalyst for the anionic polymerization of a lactam. The at least one catalyst therefore preferably allows the formation of lactam anions. The at least one catalyst is therefore capable of forming lactamates by removing the nitrogen-bonded proton of the at least one lactam (component (A)).

Lactam anions per se can equally function as the at least one catalyst. The at least one catalyst can also be called initiator.

Suitable components (B) are known per se to the person skilled in the art, and are described by way of example in "Polyamide. Kunststoff-Handbuch" [Polyamides. Plastics Handbook], Carl-Hanser-Verlag 1998.

It is preferable that component (B) is selected from the group consisting of alkali metal lactamates, alkaline earth metal lactamates, alkali metals, alkaline earth metals, alkali metal hydrides, alkali earth metal hydrides, alkali metal hydroxides, alkaline earth metal hydroxides, alkali metal alcoholates, alkaline earth metal alcoholates, alkali metal amides, alkaline earth metal amides, alkali metal oxides, alkaline earth metal oxides, and organometallic compounds.

The present invention therefore also provides a process in which component (B) is selected from the group consisting of alkali metal lactamates, alkaline earth metal lactamates, alkali metals, alkaline earth metals, alkali metal hydrides, alkali earth metal hydrides, alkali metal hydroxides, alkaline earth metal hydroxides, alkali metal alcoholates, alkaline earth metal alcoholates, alkali metal amides, alkaline earth metal amides, alkali metal oxides, alkaline earth metal oxides, and organometallic compounds.

It is particularly preferable that component (B) is selected from alkali metal lactamates and alkaline earth metal lactamates.

Alkali metal lactamates are known per se to the person skilled in the art. Examples of suitable alkali metal lactamates are sodium caprolactamate and potassium caprolactamate.

Examples of suitable alkaline earth metal lactamates are magnesium bromide caprolactamate, magnesium chloride caprolactamate, and magnesium biscaprolactamate. Examples of suitable alkali metals are sodium and potassium, and examples of suitable alkaline earth metals are magnesium and calcium. Examples of suitable alkali metal hydrides are sodium hydride and potassium hydride, and suitable alkali metal hydroxides are sodium hydroxide and potassium hydroxide. Examples of suitable alkali metal alcoholates are sodium methanolate, sodium ethanolate, sodium propanolate, sodium butanolate, potassium methanolate, potassium ethanolate, potassium propanolate, and potassium butanolate.

In another embodiment that is in particular preferred, component (B) is selected from the group consisting of sodium hydride, sodium, sodium caprolactamate, and a solution of sodium caprolactamate in caprolactam. Particular preference is given to sodium caprolactamate and/or a solution of sodium caprolactamate in caprolactam (for example Brüggolen C10, from 17 to 19% by weight of sodium caprolactamate and caprolactam). The at least one catalyst can be used in the form of solid or in solution. It is preferable that the at least one catalyst is used in the form of solid. It is in particular preferable that the catalyst is added to a caprolactam melt in which it can be dissolved.

It is clear to the person skilled in the art that if component (B) is by way of example an alkali metal this reacts on contact with the at least one lactam (component (A)) and thus forms an alkali metal lactamate.

Component (C): Activator

Component (C) in the invention is at least one activator.

For the purposes of the present invention, the terms "component (C)" and "at least one activator" are used as synonyms, and therefore have the same meaning.

Any activator known to the person skilled in the art that is suitable for activating the anionic polymerization of the at least one lactam (component (A)) is suitable as the at least one activator. It is preferable that the at least one activator is selected from the group consisting of N-substituted lactams, diisocyanates, polyisocyanates, allophanates, and diacyl halides; it is particularly preferable that the at least one activator is selected from the group consisting of N-substituted lactams.

The present invention therefore also provides a process in which component (C) is selected from N-substituted lactams, diisocyanates, polyisocyanates, allophanates, and diacyl halides.

It is preferable that the N-substituted lactams have electrophilic N-substitution. Examples of suitable lactams having electrophilic N-substitution are acyllactams, for example N-acetylcaprolactam, and precursors of these which, together with the at least one lactam (component (A)), form an activated lactam in situ. An example of another suitable N-substituted lactam is a capped diisocyanate.

Diisocyanates that can be used are not only aliphatic diisocyanates but also aromatic diisocyanates. Among the aliphatic diisocyanates are by way of example butylene diisocyanate, hexamethylene diisocyanate, octamethylene diisocyanate, decamethylene diisocyanate, undecamethylene diisocyanate, dodecamethylene diisocyanate, 4,4'-methylenebis(cyclohexyl isocyanate), and isophorone diisocyanate. Examples of aromatic diisocyanates are tolyl diisocyanate and 4,4'-methylenebis(phenyl) isocyanate. Examples of polyisocyanates are isocyanates derived from hexamethylene diisocyanate (Basonat HI 100/BASF SE). Examples of suitable allophanates are ethyl allophanates.

Suitable diacyl halides are not only aliphatic diacyl halides but also aromatic diacyl halides. Suitable aliphatic diacyl halides are compounds such as butylenedioyl chloride, butylenedioyl bromide, hexamethylenedioyl chloride, hexamethylenedioyl bromide, octamethylenedioyl chloride, octamethylenedioyl bromide, decamethylenedioyl chloride, decamethylenedioyl bromide, dodecamethylenedioyl chloride, dodecamethylenedioyl bromide, 4,4'-methylenebis(cyclohexyloyl chloride), 4,4'-methylenebis(cyclohexyloyl bromide), isophoronedioyl chloride, and isophoronedioyl bromide; suitable aromatic diacyl halides are compounds such as tolylmethylenedioyl chloride, tolylmethylenedioyl chloride, 4,4'-methylenebis(phenyloyl chloride), 4,4'-methylenebis(phenyloyl bromide).

In a preferred embodiment, component (C) is selected from the group consisting of hexamethylene diisocyanate, isophorone diisocyanate, hexamethylenedioyl bromide, hexamethylenedioyl chloride, and mixtures of these; it is particularly preferable to use hexamethylene diisocyanate.

The at least one activator can be used in solution. In particular, the at least one activator can be dissolved in caprolactam.

An example of another product suitable as at least one activator is Brüggolen® C20, 80% caprolactam-blocked hexamethylene 1,6-diisocyanate in caprolactam from Brüggemann, DE.

Component (D): Fiber Material

Component (D) in the invention is at least one fiber material.

For the purposes of the present invention, the terms "component (D)" and "at least one fiber material" are used as synonyms, and therefore have the same meaning.

Any of the fiber materials known to the person skilled in the art are suitable as the at least one fiber material. It is preferable that component (D) is selected from the group of inorganic fiber materials, organic fiber materials, and natural fiber materials.

Examples of inorganic fiber materials are boron fiber materials, glassfiber materials, carbon fiber materials, silica fiber materials, ceramic fiber materials, and basalt fiber materials.

Examples of organic fiber materials are aramid fiber materials, poly(p-phenylene-2,6-benzobisoxazole) fiber materials, polyester fiber materials, nylon fiber materials, and polyethylene fiber materials.

Examples of natural fiber materials are wood fiber materials, flax fiber materials, hemp fiber materials, and sisal fiber materials.

It is preferable that component (D) is selected from the group consisting of glassfiber materials, carbon fiber materials, aramid fiber materials, poly(p-phenylene-2,6-benzobisoxazole) fiber materials, boron fiber materials, metal fiber materials, and potassium titanate fiber materials. It is in particular preferable that component (D) is a glassfiber material.

The present invention therefore also provides a process in which component (D) is selected from the group consisting of glassfiber materials, carbon fiber materials, aramid fiber materials, poly(p-phenylene-2,6-benzobisoxazole) fiber materials, boron fiber materials, metal fiber materials, and potassium titanate fiber materials.

The at least one fiber material can be used in any of the forms known to the person skilled in the art. The at least one fiber material can by way of example be used in the form of textile sheet, in the form of individual fiber, or in the form of fiber bundle.

Textile sheets are known to the person skilled in the art. The term textile sheets is used by way of example for woven fabrics, knitted fabrics, laid scrims, and nonwoven fabrics. The term fiber bundle is used by way of example for rovings, chopped glassfibers, and prepregs. It is preferable that component (D) is a fiber bundle.

Preferred fiber bundles are composed by way of example of from 100 to 100 000 individual fibers, preferably from 1000 to 70 000 individual fibers, and with particular preference from 2000 to 50 000 individual fibers.

The linear density of the fiber bundles is by way of example in the range from 50 to 10 000 tex (1 tex=1 g of fiber per 1000 m), preferably in the range from 500 to 8000 tex, and with particular preference in the range from 800 to 6000 tex.

It is preferable in the process of the invention that when component (D) is introduced into the extruder it is in a form selected from the group consisting of rovings, chopped glassfibers, ground glassfibers, and prepregs.

The present invention therefore also provides a process in which, before the compounding of components (A), (B), (C), and (D), when component (D) is introduced into the extruder it is in a form selected from the group consisting of rovings, chopped glassfibers, ground glassfibers, and prepregs.

It is particularly preferable that when component (D) is introduced into the extruder in the process of the invention it is in a form selected form the group consisting of rovings, chopped glassfibers, and prepregs.

The present invention therefore also provides a process in which, before the compounding of components (A), (B), (C), and (D), when component (D) is introduced into the extruder it is in a form selected from the group consisting of rovings, chopped glassfibers, and prepregs.

In an embodiment that is in particular preferred, the provision of the first mixture (M1) in step a) of the process of the invention therefore comprises the following steps:
  a1) introduction of component (A) into the extruder,
  a2) addition of component (D) in a form selected from the group consisting of rovings, chopped glassfibers, ground glassfibers, and prepregs, preferably in a form selected from the group consisting of rovings, chopped glassfibers, and prepregs, to component (A) in the extruder, and a3) compounding of components (A) and (D) in the extruder to give the first mixture (M1).

The present invention therefore also provides a process in which the provision of the first mixture (M1) in step a) comprises the following steps:
a1) introduction of component (A) into the extruder,
a2) addition of component (D) in a form selected from the group consisting of rovings, chopped glassfibers, ground glassfibers, and prepregs to component (A) in the extruder, and
a3) compounding of components (A) and (D) in the extruder to give the first mixture (M1).

During the compounding of components (A), (B), (C), and (D) in the extruder, component (D) is usually comminuted. "Comminution" means for the purposes of the present invention shortening of component (D), in particular of the fiber bundles preferably used as component (D). The fiber bundles preferably used as component (D) moreover disintegrate. This means that the fiber bundles are divided and then take the form of individual fibers. With particular preference, the polymerizable mixture (pM) comprises individual fibers which are shorter than the fiber bundles which are introduced into the extruder, and which are preferably used as component (D).

The component (D) in the polymerizable mixture (pM) takes the form, for example, of individual fibers with a length in the range from 10 to 1000 μm, preferably in the range from 20 to 500 μm, and especially preferably in the range from 30 to 300 μm.

The present invention therefore also provides a process in which component (D) comprised in the polymerizable mixture (pM) takes the form of individual fiber of length in the range from 10 to 1000 μm.

Without any intention of resultant restriction of the invention, it is believed that component (D) is in particular comminuted in the kneading zones of the extruder.

It is self-evident that component (D) is not only comminuted during the compounding of components (A), (B), (C), and (D) but, in the preferred embodiment in which the first mixture (M1) is initially provided in step a), is already at least partially comminuted when only component (A) is compounded with component (D).

Polyamide (P)

The polymerizable mixture (pM) of the invention can be used for the production of a polyamide (P).

This involves polymerizing the polymerizable mixture (pM) to give the polyamide (P).

The present invention therefore also provides a process for the production of a polyamide (P), where the polymerizable mixture (pM) obtainable by the process of the invention is polymerized to give the polyamide (P).

The polymerization of the polymerizable mixture (pM) is usually initiated in that the polymerizable mixture (pM) is heated to a temperature above the melting point of the at least one lactam. It is preferable that the polymerizable mixture (pM) is heated to a temperature below the melting point of the polyamide (P).

It is self-evident that the melting point of component (A) is below the melting point of the polyamide (P).

By way of example, the polymerizable mixture (pM) is heated, for the polymerization reaction, to a temperature in the range from 130 to 180° C., preferably in the range from 135 to 170° C., and with particular preference in the range from 140 to 160° C.

The at least one lactam comprised in the polymerizable mixture (pM) polymerizes here, and the polyamide (P) is obtained.

The present invention therefore also provides a polyamide (P) obtainable by the process described for the production of a polyamide (P).

For the polymerization reaction, the polymerizable mixture (pM) can by way of example be introduced into a mold. During the polymerization reaction of the polymerizable mixture (pM), a molding is then obtained from the polyamide (P).

The present invention therefore also provides a molding made of the polyamide (P) of the invention.

The present invention further provides the use, for the production of a polyamide (P), of the polymerizable mixture (pM) produced in the invention.

The invention claimed is:

1. A process for the production of a polymerizable mixture (pM) that includes the following components:
   (A) at least one lactam,
   (B) at least one catalyst,
   (C) at least one activator, and
   (D) at least one fiber material wherein the process comprises compounding the components (A), (B), (C), and (D) in an extruder with a shear rate of at least 500 s$^{-1}$ to produce the polymerizable mixture (pM), wherein said compounding comprises the following steps:
   a) providing, in the extruder, a first mixture (M1) that includes components (A) and (D),
   b) adding the component (C) to the first mixture (M1) in the extruder to produce a second mixture (M2) in the extruder,
   c) adding the component (B) to the second mixture (M2) in the extruder to produce the polymerizable mixture (pM),
   wherein the extruder includes at least the following sections:
   (I) a first section,
   (II) a second section, and
   (III) a third section,
      wherein the first section (I) has a first temperature (T1), the second section (II) has a second temperature (T2), and the third section (III) has a third temperature (T3), wherein the first temperature (T1) is in a range from 20° C. to 70° C., the second temperature (T2) is in a range from 105° C. to 220° C., and the third temperature (T3) is in a range from 20° C. to less than 105° C., and
      wherein the polymerizable mixture (pM) includes from 28.5% to 90% by weight of the component (A), from 1% to 20% by weight of the component (B), from 0.5% to 10% by weight of the component (C), and from 8.5% to 70% by weight of the component (D), based in each case on a total weight of the polymerizable mixture (pM).

2. The process according to claim 1, wherein the following step is carried out after step c):
   d) pelletizing the polymerizable mixture (pM) to produce a pelletized polymerizable mixture (gpM).

3. The process according to claim 2, wherein at most 10 minutes elapses the time that expires between step c) and obtaining the pelletized polymerizable mixture (gpM) in step d).

4. The process according to claim 1, wherein the steps b) and c) are carried out simultaneously to produce directly the polymerizable mixture (pM) from the first mixture (M1), component (C) and component (B).

5. The process according to claim 4, wherein the second section (II) of the extruder includes from 2 to 10 kneading zones and from 1 to 10 conveying zones.

6. The process according to claim 1, wherein the component (D) is selected from the group consisting of glassfiber materials, carbon fiber materials, aramid fiber materials, poly(p-phenylene-2,6-benzobisoxazole) fiber materials, boron fiber materials, metal fiber materials, and potassium titanate fiber materials.

7. The process according to claim 1, wherein the component (D) in the polymerizable mixture (pM) is in a form of an individual fiber of length from 10 µm to 1000 µm.

8. The process according to claim 1, wherein the polymerizable mixture (pM) also includes a component (E) including at least one thickener, wherein the component (E) is selected from the group consisting of thermoplastic polystyrenes, polysulfones, polyphenylethers, polybutadienes, polyisoprenes, and nanofillers.

9. The process according to claim 1, wherein the third section (III) of the extruder includes from 1 to 5 mixing zones, from 1 to 5 kneading zones, from 2 to 10 conveying zones, and from 1 to 5 flow-restricting zones.

* * * * *